United States Patent [19]

Dejaiffe

[11] Patent Number: 4,677,022
[45] Date of Patent: Jun. 30, 1987

[54] PROCESS FOR MAKING LIGHTWEIGHT BODY SUITABLE FOR USE AS AN ADDITIVE IN AN ARTICLE OF MANUFACTURE, SUCH LIGHTWEIGHT BODY ITSELF, AND COMPOSITE CONTAINING SAME

[75] Inventor: Robert Dejaiffe, Oak Ridge, N.J.

[73] Assignee: Potters, Industries, Inc., Hasbrouck, N.J.

[21] Appl. No.: 822,054

[22] Filed: Jan. 24, 1986

[51] Int. Cl.$^4$ .............................................. B32B 5/16
[52] U.S. Cl. .............................. 428/312.6; 428/325;
428/331; 428/219; 428/220; 428/402; 428/406
[58] Field of Search ............... 428/406, 402, 312.6,
428/325, 331, 219, 220

[56] References Cited

U.S. PATENT DOCUMENTS

| | | |
|---|---|---|
| 2,797,201 | 6/1957 | Veatch et al. . |
| 2,978,339 | 4/1961 | Veatch et al. . |
| 2,978,340 | 4/1961 | Veatch et al. . |
| 3,030,215 | 4/1962 | Veatch et al. . |
| 3,129,086 | 4/1964 | Veatch et al. . |
| 3,166,615 | 1/1965 | Farrell . |
| 3,365,315 | 1/1968 | Beck et al. . |
| 3,429,955 | 2/1969 | Johnson et al. ................. 428/406 X |
| 4,234,330 | 11/1980 | Taupin et al. . |
| 4,391,646 | 7/1985 | Howell . |

*Primary Examiner*—Alexander S. Thomas
*Attorney, Agent, or Firm*—Lee C. Robinson, Jr.

[57] ABSTRACT

A process for making a body suitable for use as an additive for incorporation in a plastic, which comprises the steps of forming a blend of glass-forming materials, converting the blend of glass-forming materials into a solidified porous form, and heating such solidified porous blended glass-forming materials to form an exterior glassy shell thereon; as well as lightweight body made by such process, and an article of manufacture incorporating such body.

21 Claims, 2 Drawing Figures

4,677,022

PROCESS FOR MAKING LIGHTWEIGHT BODY SUITABLE FOR USE AS AN ADDITIVE IN AN ARTICLE OF MANUFACTURE, SUCH LIGHTWEIGHT BODY ITSELF, AND COMPOSITE CONTAINING SAME

FIELD OF THE INVENTION

The present invention relates to a method of producing lightweight bodies having a glassy exterior which are suitable for use as modifiers, enhancers, fillers, extenders and opacifiers in polymeric formulations. The invention also relates to the lightweight bodies themselves and to plastic composites in which those lightweight bodies are incorporated.

BACKGROUND OF THE INVENTION

It has heretofore been a conventional practice to incorporate solid glass particles in certain plastics as filler material. However, there are drawbacks to this practice. Such solid glass structures are typically on the order of 2.3-2.6 g/cc, which is undesirably dense for many applications, such as those in which weight-minimization is a desideratum. Also, use of solid glass particles as filler material in plastics imparts an unattractive greyish off-color to those plastics.

As an alternative to the use of solid glass particles as filler material, the art has proposed the use of low density glassy particles as fillers. The approach generally taken in providing such lightweight particles is production of hollow glass spheres, commonly known as microballoons. Conventional microballoon technology generally involves the utilization of glass particles and a substance referred to as a blowing agent. The object is to obtain molten glass by heating the particles and then, by releasing the blowing agent, expand the molten glass into glass particles having a hollow interior (possibly containing gas at a pressure higher than atmospheric). Examples of patents directed to such embodiments are Beck et al. U.S. Pat. No. 3,365,315, granted Jan. 23, 1968, and Taupin et al. U.S. Pat. No. 4,234,330, granted Nov. 18, 1980. Alternatively, it has also been suggested to combine glass-forming materials and a blowing agent (or substances which upon reaction generate a blowing agent), and then effect simultaneous glass formation and triggering of the release of the blowing agent to cause expansion of the molten glass after its formation. Examples of patents relating to these latter embodiments are Veatch et al. U.S. Pat. No. 2,797,201, granted June 25, 1957, Veatch et al. U.S. Pat. No. 2,978,339, granted Apr. 4, 1961, Veatch et al. U.S. Pat. No. 2,978,340, granted Apr. 4, 1961, Veatch et al. U.S. Pat. No. 3,030,215, granted Apr. 17, 1962, Veatch et al. U.S. Pat. No. 3,129,086, granted Apr. 14, 1964 DeVos et al. U.S. Pat. No. 4,059,423, granted Nov. 22, 1977 and DeVos et al. U.S. Pat. No. 4,063,916, granted Dec. 20, 1977.

However, conventional microballoon techniques have serious shortcomings. It is impractically difficult to obtain microballoons which have a density sufficiently high and sufficiently uniform (from particle to particle) to make them commercially useful for incorporation in thermosetting plastics or thermoplastics. This is the result of the high degree of difficulty entailed in attempting to control the action of the blowing agent. More specifically, the problem arises because the blowing agent has the tendency to expand within the particles of molten glass until their walls become so thin that the blowing agent passes through by diffusion. This causes the particles to have densities which are normally in the range of 0.1 g/cc to 0.7 g/cc. Although densities up to 1.0 g/cc have apparently been attained using conventional technology, it is not clear whether those densities can be reproducibly obtained; in any event, the difficulty involved in attaining densities of that magnitude would, it stands to reason, increase the cost of manufacture disadvantageously. As examples of the manner in which conventional microballoons are deficient, it is noted that (a) because their density is less than that of the typical density of the liquid reaction mixture used to make cast thermosetting plastics, conventional microballoons have a tendency to separate out and float in that liquid thereby preventing a uniform distribution of the filler particles in the ultimately cast product, and (b) the thin-walled structure of the conventional microballoons causes them to be relatively low in strength, which results in their collapse or being crushed or broken when included in thermoplastics that are subjected to the high pressures and shearing forces exerted in extruding equipment, injection molding equipment and compounding equipment.

It is a further disadvantage of conventional microballoons that their chemical compositions are often limited within a narrow range as a prerequisite of practicing such technology. Consequently, it is often the case that substances which are damaging to plastics in which the conventional microballoons are being incorporated must nevertheless be employed because of the compositional constraints imposed in order to make the microballoons.

OBJECTS AND STATEMENT OF THE INVENTION

It is an object of the present invention to provide lightweight bodies having a glassy exterior at low cost, and a simple and direct method of making same.

It is a second object of this invention to provide lightweight bodies having a glassy exterior which, when incorporated in an amount of plastic material as an additive, increase the plastic amount's weight only minimally while enhancing processability and properties appreciably, and a method of obtaining same.

It is a further object of this invention to provide lightweight bodies having a glassy exterior and exhibiting relatively high strength and resistance to crushing or breaking, and a method of making same.

It is another object of the present invention to provide lightweight bodies having a glassy exterior which have density comparable to that of liquid reaction mixtures for forming cast thermosetting plastics, and also to that of thermoplastics, and a method of obtaining same.

It is yet another object of the present invention to provide lightweight bodies having a glassy exterior which, due to the absence of compositional constraints on practice of the invention, can be formulated so as to be chemically compatible with a wide range of plastics, as well as to provide a method of making same.

It is still another object of the present invention to provide plastic composites which contain lightweight bodies as aforesaid, and a method of formulating same.

These objects are satisfied by the present invention.

In one of its aspects, the invention is directed to an article of manufacture which is a body comprising a porous core of glass-forming materials and integral therewith a surrounding shell of glassy material.

In another of its aspects, the present invention is directed to a process for making a body suitable for use as an additive for incorporation in a plastic, which comprises the steps of forming a blend of glass-forming materials; converting the blend of glass-forming materials into a solidified porous form; and heating such solidified porous blended glass-forming materials to form an exterior glassy shell thereon.

In yet another of its aspects, the invention is directed to an article of manufacture which is a composite comprising a plurality of bodies which have a porous core of glass-forming materials and integral therewith a surrounding fused shell of glassy material, and a matrix of thermosetting plastic or thermoplastic in which the plurality of bodies is incorporated.

The lightweight bodies having a glassy exterior in accordance with the invention are suitable for use, inter alia, as high performance additives for plastics. The lightweight bodies of the invention are advantageous in that they have relatively high strength and a density which is controllable and reproducible so as to be compatible with plastic materials into which the bodies are incorporated, particularly cast thermosetting plastics and thermoplastics. And, inasmuch as the invention provides bodies which are much lighter in weight than solid glass particles which are conventionally employed, their incorporation in materials such as plastics is highly advantageous due to the fact that they are only minimally more dense—or sometimes no more dense or even less dense—than the material to which they are added. Thus, the practitioner of the invention avoids the substantial "weight penalty" which is ordinarily attendant upon use of solid glass particles as filler, while nonetheless maintaining the relatively high strength properties which make the invention useful in extruding, injection molding and like applications. Moreover, the invention provides its practitioner with a flexibility in choice of chemical composition for the lightweight bodies. This enables him to match the constituent materials of the lightweight body with the material (for example, plastic) in which the bodies are being incorporated - all with a view toward avoiding or minimizing deterioration of the material's properties resulting from its combination with lightweight bodies containing one or more constituents which degrade the material. Additionally, practice of the invention results in the attainment of an attractive and reproducible white color in plastic materials, especially thermosetting plastic materials, into which the lightweight bodies of the invention are incorporated. This contrasts with the less attractive, and less reproducibly obtained, greyish off-color attendant upon incorporation of solid glass particles and conventional microballoons.

The present invention, including further objects, features and advantages, will be more fully understood from the following detailed description.

DESCRIPTION OF CERTAIN PREFERRED EMBODIMENTS

Figure 2:
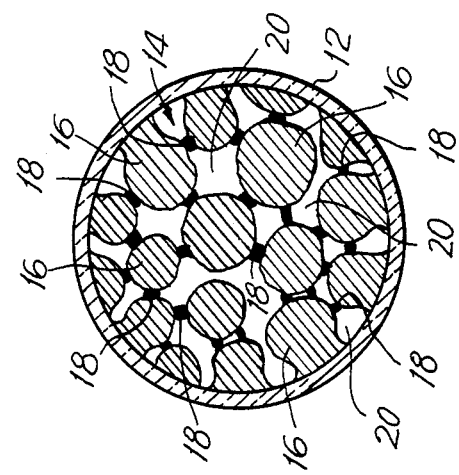
FIG. 2 is a schematic cross-sectional view of the body of FIG. 1 taken along the line 2—2 of FIG. 1.

A central feature of the present invention is the processing of glass-forming materials without incorporation of a traditional blowing agent. This is accomplished as follows.

To produce lightweight bodies in accordance with the invention, one suitably forms a blend of an appropriate source of silicon, preferably silica—especially a fine, pure silica—as well as other appropriate fluxing materials conventionally employed in the production of glass. Typically, this is accomplished through the use of an aqueous slurry of lime (calcium hydroxide), and a second aqueous slurry of silica and other appropriate fluxing materials, for example sodium silicate. Normally water is used sparingly in forming the slurries, as in practice the water is often desirably evaporated or otherwise removed during processing. The slurries are then combined to form a blend (in this case, aqueous) of glass-forming materials for further handling as described hereinafter.

The glass-forming materials are used in amounts which will result in the obtaining of the desired composition in the exterior glassy shell of the final product, as discussed in more detail below. Those of ordinary skill in the art, equipped with the teachings herein, will be able to select appropriate amounts of glass-forming materials for incorporation in the blend (for example, in the above-mentioned slurries and aqueous blend) without undue experimentation. In this connection, it is important to note that the invention is not limited to the utilization of soda lime glass compositions, but encompasses a wide range of other conventional glass compositions, such as aluminosilicate glass compositions and borosilicate glass compositions. Thus, the glass-forming materials utilized are selected to effect formation of the desired glass composition.

Once a blend of glass-forming materials is formulated, conversion to a solidified porous form, to be used as feedstock for further processing, is accomplished.

Illustratively, when an aqueous slurry of silica and sodium silicate is combined with an aqueous slurry of lime (calcium hydroxide), a reaction occurs by which a gel, typically a porous solid, containing such glass-forming materials is produced. This is an advantageous embodiment because, among other reasons, the gel or solid can be handled even before drying, which facilitates processing.

In the foregoing and other embodiments of this invention, the blend of glass-forming materials (e.g., in gel or solid form) is typically dried and then comminuted into suitably sized particles of feedstock material. This is advantageously done by means of baking, crushing and screening, or instead pelletizing, the blend of glass-forming materials as desired. However, it can readily be appreciated that any other suitable means of drying and comminuting which one of ordinary skill in the art could devise can be employed.

In an alternative embodiment, appropriate feedstock material for later processing can be produced with a blend formed from the glass-forming materials and a liquid carrier (e.g., an aqueous blend formed from combined aqueous slurries of the glass-forming materials) by spray drying such blend to evaporate its liquid content. Especially in embodiments involving the mixed aqueous slurries, it is advantageous to prevent the reaction by which the mixed glass-forming materials are formed into a gel as described above, in order not to inhibit the spray drying operation. This is suitably accomplished by incorporation of a small amount of sodium hydroxide (or a like material which is not incompatible with the selected composition of the lightweight bodies) in the blended glass-forming materials and a corresponding decrease in the amount of sodium silicate (or sodium carbonate or other fluxing material(s) as appropriate).

The silica utilized is advantageously of size 10 microns or less, for example about 6 microns, in maximum particle dimension. However, particle size may vary consistently with the objects and aims of the invention to achieve the desired result in the final product. The silica is generally that which is commercially available and satisfies the needs of the invention's practitioner. Silica in the form of marine sediment is suitable, especially fine pure silica of the type available commercially from large deposits in Illinois. However, other sources can be used. Perlite, diatomaceous earth, and fly ash are also examples of suitable sources of silica. The general criteria for determining the suitability of a source of silica for use in the present invention is that particle size be fine, high in silica (or combined silica and alumina) and free of coloring agents which would tend to darken the final product.

In yet another processing variation within the scope of the invention, only half of the selected amount of lime is actually utilized in the lime slurry for reaction with the other slurry's components. Using only half the total amount of lime to be incorporated, feedstock (that is, dried sized blended glass-forming materials) is produced in the usual manner, for instance, by baking, crushing and screening or pelletizing, as discussed above. After sizing of the feedstock particles, the remaining lime is mixed into the feedstock so as to distribute it evenly over the surfaces of the feedstock particles. As can be appreciated, this provides something of a boost to the fluxing of the surface of the feedstock, thereby facilitating faster initial melting of the glass-forming materials on the exterior of the particles, better rounding of the particles, better glass formation, and the more complete sealing in of air trapped inside the feedstock particles (in the porous or honeycomb core structure as will be discussed in more detail hereinafter).

By processing in the foregoing manner, dried feedstock particles of blended glass-forming materials, which particles have a solidified porous (or honeycomb) structure, are obtained. Given the fact that the final product lightweight bodies having a glassy exterior are substantially the same size as, or in some cases slightly smaller than, the feedstock particles of blended glass-forming materials from which they are made, the feedstock particle size is easily determined by the ordinarily skilled worker based on the desired final product particle size. That latter particle size is discussed in greater detail below.

The desired final product lightweight bodies of the invention are formed by subjecting the feedstock particles to an amount of heat sufficient to fuse the glass-forming materials on the exterior of the feedstock particles into a continuous shell. During this treatment, the exterior material of the feedstock particles is converted to a glassy state. Depending on the amount of heat energy imparted to the feedstock particles, the core of each particle is either left in the form of a porous or honeycomb structure of glass-forming materials encased within the glassy exterior shell, or is instead completely fired and converted to molten glass. In that latter case, the molten glass core material becomes adhered to the exterior glass shell leaving the interior of the lightweight particle hollow. This yields a microballoon. However, since the microballoon has not been produced in conventional manner, by expansion of molten glass through the use of a blowing agent, the walls of the microballoon are sufficiently and reproducibly thick so as to confer the advantages of the invention in respect of density-compatibility and resistance to high-pressure crushing, breaking, etc. In any event, the amount of heat energy imparted to the glass-forming materials to achieve the desired result (and accordingly the intensity and time of heating to which the glass-forming materials are appropriately subjected) can be ascertained without undue experimentation by one exercising ordinary skill in the art, once equipped with the teachings herein.

The feedstock material can be heated in any manner which is convenient and suitable for firing at least the exterior glass-forming materials, or firing to a greater extent if desired. In a particularly useful heating procedure the feedstock particles are conducted into a heating zone having an upper cooler region and a lower hotter region. This is ordinarily implemented through use of a burner arrangement which provides a shorter, hotter flame in a lower region of the zone and a longer, cooler flame in an upper region thereof. The feedstock particles are typically introduced into the zone at its upper end. Through use of this procedure, the invention's practitioner can compensate for differences in feedstock particle size during flame exposure. More specifically, since larger feedstock particles are less likely to rise (or conversely, more likely to fall faster) they receive a greater amount of flame exposure by virtue of their residence in the lower, hotter region of the heating zone than do lighter (smaller) feedstock particles which generally reside in the upper cooler region. This ensures that the larger, heavier feedstock particles receive adequate flame exposure, whereas smaller, lighter feedstock particles tend toward the upper, cooler heating region where they get commensurately less intense and less prolonged flame exposure.

In an alternative arrangement, the feedstock particles can be introduced at the bottom of the heating zone. In this arrangement heat is supplied by flame located at the bottom of the heating zone; as with the embodiment described in the preceding paragraph, this is implemented by appropriate location of a suitable burner element, in this case at the lower end of the heating zone. The feedstock particles then travel up through the heating zone where they are appropriately heated to the extent necessary to effect the desired degree of firing. The larger feedstock particles rise more slowly through the heating zone and thus are subjected to more intense heating for a longer time than are the smaller particles. By the aforementioned technique the amount of flame exposure (both in terms of time and intensity) can be varied commensurately with feedstock particle size to make sure that the particles receive an appropriate amount of heat exposure.

While the practitioner can employ any suitable technique which, in view of the teachings herein, could be devised by one of ordinary skill in the art to introduce the feedstock particles into the heating zone, the particles are advantageously injected into the heating zone by entraining them in a current of feed air blown into the zone. In some embodiments a combustible gas, for example methane, is mixed with the feed air current to prevent the feed air from causing a cold "hole" in the burner flame(s) supplying heat to the zone. An especially advantageous embodiment for injecting feedstock particles into the heating zone is to provide in association with the heating means (for example, burner assembly) an injection slot which is angled in relation to the heating means such that the feedstock particles can be blown up (or down) into the zone heated by that means (for example, blown down into the flames from the burner assembly). The injection slot is preferably adjustable so that the angle of injection of the feedstock particles can be varied as desired.

After the selected degree of firing—that is, after sufficient firing so that the exterior glass-forming materials on the feedstock particles are fused into a glassy shell, or after further firing as desired—the particles are recovered from the heating zone by any suitable means within the ordinary skill of the art. They are advantageously conducted to a baghouse arrangement or cyclone separator, but recovery can in some embodiments be achieved simply by allowing the particles to drop into an appropriate receptacle or hopper. As soon as the particles leave the heating zone they begin to air-cool. Since they are of rather small size (as will be discussed below) their cooling rate is quite high, and air-cooling between the heating zone and recovery zone is usually sufficient. However, if desired, additional cooling means, for instance, contacting of the fired particles with cooled air, can be utilized.

Figure 1:
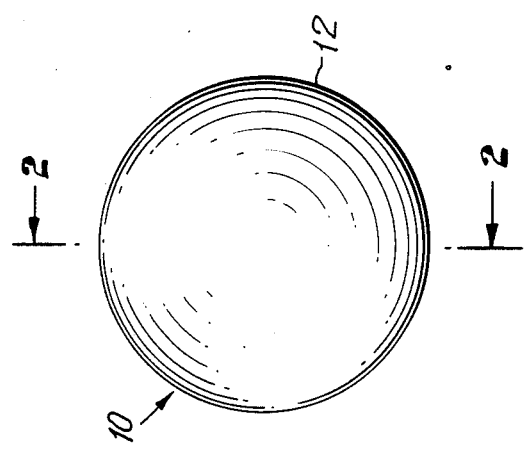
FIG. 1 is a schematic view of a lightweight body in accordance with the present invention.

As noted above, the final product lightweight bodies obtained through processing in accordance with the foregoing discussion are either of the type commonly referred to as microballoons (hollow glass particles) or instead comprise a glassy exterior shell within which is encased a porous core of glass-forming materials. The latter type of lightweight body is the result of firing only to the extent that the exterior materials are converted to a glassy form and fused so as to provide a surrounding shell. Such a lightweight body is depicted in FIGS. 1 and 2. The body 10 is typically spheroidal as shown in FIG. 1, and has a glassy exterior shell 12. As appears from FIG. 2, within shell 12 there is a core material 14 which is integral with the shell and comprises particles of silica 16 adhered to one another in this case by deposits of sodium silicate 18. The core material 14 is porous as it contains passages 20 in which air is trapped; this gives the core a honeycomb appearance. It should be noted that the drawings are schematic in nature and, accordingly, the components thereof are not strictly proportioned or configured so as to correspond to their actual relative sizes and shapes; rather certain features have been emphasized for the sake of clarity. Additionaly, possible irregularities in the surfaces of the glassy shell (especially at the interface between it on the grains of silica), and portions of the porous core lying behind the plane shown in cross-section, have not been shown for the sake of clarity and simplicity.

As previously mentioned, it is due to forebearance in the amount of heating to which the feedstock particles are exposed, that the core remains a blend of glass-forming materials retaining the porous or honeycomb structure it exhibited in the feedstock state. Also as appears from the disclosure herein, this porous core/exterior glass shell structure is highly useful in providing a reproducibly uniform particle density as desired and/or a high degree of resistance to crushing, breaking or the like under pressures on the order of those exerted during extruding, injection molding, etc.

While the lightweight bodies which are produced in the foregoing manner are advantageously spheroidal in configuration (spheroidal shape is typically promoted by an increase in time and/or intensity of heating), in some embodiments they are of other shapes, for example ellipsoidal, etc., or are even irregularly shaped. The density of the lightweight bodies can be varied throughout a fairly wide range as desired and necessary for the end application intended, but is preferably from 1.0 to 1.8 g/cc. As discussed in a preceeding paragraph, the size of the final product lightweight bodies is determined primarily by the size of the feedstock particles utilized in their production. In many embodiments of the invention the size of the final product lightweight body is of from 45 to 150 microns in maximum dimension. Lightweight bodies larger than this do find application in certain embodiments, but frequently will impart poor physical properties in respect of flow and filling characteristics so that they should be used only with due consideration. Lightweight bodies smaller than 45 microns are also advantageous in some embodiments of the invention, although the density advantage (i.e., the elimination of the substantial "weight penalty") may diminish somewhat at smaller sizes since the ratio of solid material (especially in the glassy exterior shell) to gaseous volume contained within increases.

As clear from the foregoing, a particularly advantageous utilization of the final product lightweight bodies is as an additive to plastics, for instance thermosetting plastics and thermoplastics. In this connection, the term "thermosetting plastic" refers herein to those which are made by the reaction of two or more liquids and the subsequent casting of the liquid reaction mixture into a solidified product. Examples of thermosetting plastics are epoxies, polyesters and polyurethanes. These plastics are cured, that is, rendered hard by heat, and do not soften once they are cured. Additionally, as used herein the term "thermoplastic" refers to plastics which are rendered soft and moldable by heat; these plastics are usually formed into useful configurations by extruding or injection molding. The thermoplastics are generally divided into two groups, namely, commodity plastics used in low-specification applications, and engineering plastics which are more highly specified. Examples of commodity plastics are polyethylene, polypropylene, vinyl and styrene. Examples of engineering plastics are polyethylene terephthalate, polybutylene terephthalate, liquid crystal polymers, nylon, acetals and acrylics (when reinforced, polypropylene is also sometimes considered an engineering plastic).

The utilization of the final product lightweight bodies of the invention is important with regard to thermosetting plastics because it permits matching of the density of the lightweight bodies to the density of the liquid reaction mixture which is cast and cured to form thermosetting plastic articles. Addition of the lightweight bodies to the liquid reaction mixture as an additive can be carried out with confidence that, because the density of those bodies is matched to the density of the liquid reaction mixture, the particles will neither sink nor float excessively in the liquid mixture, but remain suspended uniformly therein thereby preserving an even distribution of additive through casting and curing (hardening) of the thermosetting plastic. As will be appreciated, this enables production of a cast thermosetting plastic article in which are incorporated the lightweight bodies of the invention, especially bodies of density of from 1.0 to 1.8 g/cc, in substantially uniform distribution throughout the plastic. This is a distinct superiority over conventional solid glass beads which are often of greater density than and tend to sink in the liquid reaction mixture, and over conventional microballoons which are typically of density lower than that of the liquid reaction mixture and thus tend to float in it (and furthermore are of varying density from one microballoon to the next)—all of which renders control of distribution exceedingly difficult.

Accordingly, in an important aspect, the present invention is directed to the provision of a composite comprising a plurality of lightweight bodies in accordance with the invention and a matrix of thermosetting plastic in which the plurality of bodies is incorporated and throughout which the plurality of bodies is substantially uniformly distributed.

The lightweight bodies of the invention also find an important application as fill material for thermoplastics. As with the thermosetting plastics, the density-matching capabilities which are afforded through practice of the present invention are of importance in the incorporation of the lightweight bodies in thermoplastic materials also. This is because thermoplastic articles are often processed from pellets, granules or other particulate forms of the thermoplastic material. It is these starting materials which are mixed with the lightweight bodies of the present invention to be incorporated as an additive. In such a case, density-matching enhances the retention of substantially uniform distribution of the additive in the batch of thermoplastic pellets during handling and in the final thermoplastic article. Furthermore, and as important, the lightweight bodies of the present invention are advantageously incorporated in thermoplastic materials because of the inherent strength, that is resistance to crushing, breaking or other deterioration under high pressure conditions, of those bodies. This is of significance because, as previously mentioned, thermoplastic materials are typically processed by injection molding, extruding or the like operation. The pressures which are exerted upon the the thermoplastic material during injection molding, extruding, etc. are very high. If the thermoplastic material contains an additive, then that additive must be strong enough to withstand the extremely high pressures exerted during those operations. It is a great benefit of the present invention that the lightweight bodies in accordance with it uniformly have thicker walls than the conventional microballoons (which tend toward thinner walls due to the rather uncontrollable action of the blowing agent with which they are produced). It stands to reason that a thicker wall confers greater strength, that is, resistance to crushing, breaking or the like during the exertion of high molding pressures. This enables a commercially feasible production of thermoplastic articles reinforced with the lightweight bodies of the invention. And, a further advantage of employing those lightweight bodies in the aforementioned thermoplastic materials is that a desirably low degree of shrinkage and void retention in extruded or injection molded material can be obtained.

Accordingly, in another highly preferred embodiment, the invention is in a composite comprising a plurality of lightweight bodies in accordance with the invention, and a matrix of thermoplastic material in which said plurality of bodies is incorporated.

Yet another important feature of the invention is the compositional flexibility it confers. More specifically, a wide range of glass compositions can be utilized in the invention, unlike certain prior art microballoon techniques in which narrow compositional limitations had to be observed to practice the technology. The invention's compositional flexibility is highly advantageous because it permits the matching of the glass composition employed to the particular properties of the plastic in which the lightweight bodies of the invention are used as an additive. In this manner, the practitioner is able to minimize or eliminate the presence of glass-forming substances which degrade the properties of or otherwise detrimentally affect surrounding plastic materials. For example, certain plastics, such as acetals and polycarbonates and liquid crystal polymers are sensitive to and degraded by sodium which leaches out of common soda lime glass (which has a high sodium content and a high pH of typically 11 to 12). However, substitution of borosilicate glass enhances the compatibility of the additive with such plastics because borosilicate glass has a much lower sodium content and a correspondingly lower pH (typically 8 to 9).

Accordingly, another important aspect of the invention is a composite formed of a plastic and a lightweight body in accordance with the invention and having an exterior glassy shell which contains glass-forming materials which do not degrade the properties (e.g., impact strength) of or otherwise detrimentally affect the plastic surrounding those lightweight bodies.

And, it is still another important feature of the invention that it affords a significant improvement in the color characteristics of plastic articles in which the lightweight bodies of the invention are incorporated. As touched upon previously, conventionally utilized solid glass particles and microballoons impart a decidedly off-white or greyish color to plastics filled with them. The colors of plastic articles in which such conventional fillers are incorporated vary to a certain extent and are not highly reproducible. Contrastingly, with the present invention the color of plastics in which the bodies are incorporated is attractively and reproducibly white.

The present invention is further described by way of the following example.

EXAMPLE

In order to produce a lightweight body in accordance with the invention, having a porous core of glass-forming materials and a glassy exterior shell comprising 85% silicon dioxide, 10% calcium oxide and 5% sodium oxide, the following raw material amounts are provided:

50 weight % silica fines (having a maximum dimension of 6 microns on average);
40.3 weight % Type N (sodium) silicate;
9.7 weight % calcium hydroxide.

Two slurries are formulated using the aforementioned raw materials. One is an aqueous lime slurry, and the other an aqueous slurry of the silica fines and sodium silicate. Each slurry is made with sufficient water to form a fluid. The slurries are then mixed in a suitable recepticle and they gel, forming a solid material of the desired raw material composition. This solid is then dried, crushed and screened to obtain the desired size feed stock particles. The selected feed stock particles are then fed into a zone equipped with a flame source (a burner assembly) in the zone's lower region. The particles are introduced at the bottom of the zone, and the flame is set so that the particles are exposed to heat of a sufficient intensity and for a sufficient time to cause fusion of the glass-forming materials on the exterior into a glassy shell, and to effect spheroidization. The resultant lightweight bodies are recovered from the heating zone, for instance through the use of a baghouse arrangement, and can be further size-graded as required.

The above-mentioned lightweight bodies are incorporated into the liquid reaction mixture for a polyester. The liquid reaction mixture with the incorporated additive is cast into polyester color discs and, when measured on a black/white scale of a Gardner colorimeter, the discs give a reading of 75–80. Similar polyester discs made with a solid glass bead additive give a reading of 45–50.

Additionally, the above-mentioned lightweight bodies are incorporated into an injection-molded polypropylene mass. For purposes of comparison, an injection-molded polypropylene mass containing solid glass beads, and an injection-molded polypropylene mass without incorporated beads, are also provided. The lightweight bodies do not exhibit any detectible breakage after injection molding. Furthermore, matching pieces from the molds of these three materials are compared as to final size, weight and density. The results are as set forth in the following table.

TABLE

| Sample of Injection Molded Pieces | Pure Polypropylene | Pure Polypropylene with Solid Beads | Pure Polypropylene with Lightweight Bodies |
|---|---|---|---|
| Total sample wt., g | 7.55 | 9.14 | 8.44 |
| Total sample volume, ml | 8.5 | 8.65 | 8.8 |
| Sample density, g/ml | .888 | 1.055 | .959 |
| % increase (density) | — | 18.8 | 8.0 |
| % increase (weight) | — | 20.9 | 11.8 |
| % increase (volume) | — | 1.8 | 3.5 |

The results indicate that, as an additive, the lightweight bodies of the invention yield better mold filling (increased volume of finished pieces) and result in less than half of the added density attendant upon use of the solid glass beads.

Thus, with the present invention substantial processing difficulties encountered in utilizing conventional microballoon technology are eliminated. Additionally, substantial property advantages which are not achieved with conventional solid glass particles or conventional microballoons are attendant upon practice of the invention.

The terms and expressions which have been employed herein are used as terms of description and not of limitation, and there is no intention in the use of such terms and expressions to exclude any equivalents of the features described or of portions thereof, its being recognized that various modifications are possible within the scope of the invention.

I claim:

1. As an article of manufacture a body which comprises a porous core comprising glass-forming materials including a silicon-source, and integral therewith a surrounding shell of glassy material.

2. A body as defined in claim 1, which exhibits a density of from 1.0 to 1.8 g/cc.

3. A body as defined in claim 1, which is of from 45 to 150 microns in maximum dimension.

4. A body as defined in claim 1, which is less than 45 microns in maximum dimension.

5. A body as defined in claim 1, which is spheroidal in configuration.

6. A body as defined in claim 1, wherein the glassy shell is formed of aluminosilicate glass, borosilicate glass, or soda lime glass.

7. A body as defined in claim 1, which is formed from an aqueous mixture comprising silica, calcium hydroxide, and sodium carbonate or sodium silicate.

8. A body as defined in claim 7, wherein the weight ratio of silica:calcium oxide:sodium oxide in the glassy shell is of from 3:1:1 to 98:1:1.

9. A body as defined in claim 8, wherein the weight ratio of silica:calcium oxide:sodium oxide in the glassy shell is 17:2:1.

10. As an article of manufacture, a composite which comprises a plurality of bodies each of which has a porous core comprising glass-forming materials including a silicon-source and integral therewith a surrounding shell of glassy material, and a matrix of thermosetting plastic or thermoplastic in which the plurality of bodies is incorporated.

11. A composite as defined in claim 10, wherein such bodies have a density of from 1.0 to 1.8 g/cc.

12. A composite as defined in claim 10, wherein such bodies are from 45 to 150 microns in maximum dimension.

13. A composite as defined in claim 10, wherein the weight ratio of silica:calcium oxide:sodium oxide in said shell of glassy material is of from 3:1:1 to 98:1:1.

14. As an article of manufacture, a composite which comprises a plurality of bodies each of which has a porous core comprising glass-forming materials including a silicon-source, and a matrix of thermosetting plastic in which the plurality of bodies is incorporated and throughout which the plurality of bodies is substantially uniformly distributed.

15. A composite as defined in claim 14, wherein such bodies have a density of from 1.0 to 1.8 g/cc.

16. A composite as defined in claim 14, wherein the thermosetting plastic is an epoxy, a polyester, or a polyurethane.

17. As an article of manufacture, a composite which comprises a plurality of bodies each of which has a porous core comprising glass-forming materials including a silicon-source and integral therewith a surrounding shell of glassy material, and a matrix of thermoplastic in which the plurality of bodies is incorporated.

18. A composite as defined in claim 17, wherein such bodies have a compressive strength of at least 10,000 to 15,000 psi.

19. A composite as defined in claim 17, wherein such bodies have a density of from 1.0 to 1.8 g/cc.

20. A composite as defined in claim 17, wherein the thermoplastic is an acetal, acrylic, nylon, polyethylene terephthalate, polybutylene terephthalate, polyethylene, polypropylene, vinyl, styrene or liquid crystal polymer.

21. A composite as defined in claim 17, wherein such bodies have a glass shell formed of aluminosilicate or borosilicate glass.

* * * * *